(12) United States Patent
Zhang et al.

(10) Patent No.: US 8,185,106 B2
(45) Date of Patent: May 22, 2012

(54) METHOD OF ACCESSING BASE STATION BY SUBSCRIBER STATION UNDER THE CONDITION OF MULTIPLE BASE STATIONS

(75) Inventors: Keliang Zhang, Shenzhen (CN); Liubo Mei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 981 days.

(21) Appl. No.: 12/106,194

(22) Filed: Apr. 18, 2008

(65) Prior Publication Data

US 2008/0194257 A1   Aug. 14, 2008

Related U.S. Application Data

(63) Continuation of application No. PCT/CN2006/002641, filed on Oct. 9, 2006.

(30) Foreign Application Priority Data

Oct. 19, 2005   (CN) .......................... 2005 1 0100331

(51) Int. Cl.
*H04Q 7/20* (2006.01)

(52) U.S. Cl. ........ 455/434; 455/437; 455/438; 455/439; 455/442; 455/435.1

(58) Field of Classification Search .................. 455/434, 455/442, 456.1, 453.1, 436–439
See application file for complete search history.

(56) References Cited

U.S. PATENT DOCUMENTS

| | | | |
|---|---|---|---|
| 7,813,734 B2 * | 10/2010 | Kang et al. .................... | 455/438 |
| 2005/0070283 A1 * | 3/2005 | Hashimoto et al. ......... | 455/435.1 |
| 2005/0288027 A1 * | 12/2005 | Cho et al. ...................... | 455/442 |
| 2007/0249353 A1 * | 10/2007 | Kang et al. .................... | 455/436 |

(Continued)

FOREIGN PATENT DOCUMENTS

CN   1595894 A   3/2005

(Continued)

OTHER PUBLICATIONS

IEEE 802.16e™, "IEEE Standard for Local and Metropolitan Area Networks, Part 16: Air Interface for Fixed and Mobile Broadband Wireless Access Systems, Amendment 2: Physical and Medium Access Controls Layers for Combined Fixed and Mobile Operation in Licensed Bands and Corrigendum 1," IEEE Computer Society, Feb. 28, 2006, 864 pages.

(Continued)

*Primary Examiner* — Stephen M. D'Agosta
*Assistant Examiner* — Michael Vu
(74) *Attorney, Agent, or Firm* — Conley Rose, P.C.; Grant Rodolph

(57) ABSTRACT

A method of accessing base station (BS) by subscriber station (SS) includes: after scanning signals of certain BS, SS starts ranging procedure and sends ranging request to the BS; the BS checks whether the SS belongs to the BS, if not belonging to the BS, then sends terminating ranging response to the SS; the SS interrupts the ranging procedure with the BS after receiving the terminating ranging response, and re-selects a new channel for ranging until accessing a proper BS. The above method overcomes the fault that SS may be not access a network and also may be not exit from other network under the condition of requiring SS to access fixed BS in the prior art, and solves access problem when SS is located in the area overlapping among more than two base stations.

15 Claims, 3 Drawing Sheets

U.S. PATENT DOCUMENTS

2008/0049674 A1    2/2008   Cha et al.

FOREIGN PATENT DOCUMENTS

CN           1625141 A      6/2005
KR        20050078627 A     8/2005
WO     WO 2005/074315 A1   8/2005

OTHER PUBLICATIONS

Nan, Ma, et. al.,"Key Technologies for Wireless Metropolitan Area Network," China Academic Journal Electronic Publishing House, vol. 11, No. 2, Apr. 2005, pp. 14-18.

Foreign Communication From a Related Counterpart Application, PCT Application PCT/CN2006/002641, English Translation Written Opinion dated Feb. 8, 2007, 3 pages.

* cited by examiner

METHOD OF ACCESSING BASE STATION BY SUBSCRIBER STATION UNDER THE CONDITION OF MULTIPLE BASE STATIONS

CROSS-REFERENCE TO RELATED APPLICATION

This application is a continuation of International Application No. PCT/CN2006/002641, filed Oct. 9, 2006, claiming priority to Chinese Patent Application No. 200510100331.3, filed on Oct. 19, 2005. The subject matter of both foregoing applications is incorporated herein by reference in their entirety.

FIELD OF THE INVENTION

The present invention relates to the technical field of broadband wireless access, and in particular to a method for accessing a base station (BS) from a subscriber station (SS) in the context of multiple base stations.

BACKGROUND OF THE INVENTION

Broadband wireless access devices based on 802.16d protocols may be used in a wide variety of application scenarios. One of the scenarios is that an SS accesses a predetermined BS according to network planning. One advantage of such an access approach is that the devices are relatively simple to be developed and managed, and in addition, because the SS only accesses the predetermined BS, configuration information of the SS such as QoS policy can be configured in the BS, so that different QoS configurations of different SSs can be managed conveniently.

If an SS accesses a predetermined BS, configuration information of the SS, such as all QoS policy and information for judging SS subordination, can be configured in the BS statically. In such a case, if the SS attempts to access another BS, because the BS is unable to find the configuration information of the SS, it rejects the access of the SS. Consequently, the SS can access a network if the SS accesses a BS that stores the configuration information of the SS. It can be seen that the above access approach can work normally in any area that is covered by a single BS. If the SS is in an overlap area between two or more BSs, however, the SS may be unable to access the network within a long time.

As shown in FIG. 1, an SS is in the overlap area between two base stations BS1 and BS2, and the configuration information of the SS is configured in the BS1. The SS, if starting up during a certain time period when a signal from the BS2 is strong, may scan the signal and access the BS2. When the BS2 checks and finds out that no configuration information of the SS is available, it does not establish a service connection for the SS. In addition, because the BS2 has no mechanism to notify the SS to terminate its connection to the BS2 and make another attempt to connect to the BS1, the SS is hung on the BS2. In other words, the SS is unable to access the network and unable to exit from the BS2.

SUMMARY OF THE INVENTION

The present invention provides a method for accessing a BS from an SS in the context of multiple BSs and a BS applied in the method, so as to solve the problem in the conventional solutions that the SS may be unable to access a predetermined network and unable to exit from another network in the case that the SS is required to access a predetermined BS.

A method for accessing a BS from an SS in the context of multiple BSs according to the present invention includes:

initiating a ranging process and sending a ranging request to the BS, by an SS, after the SS scans a signal from the BS;

checking by the BS whether the SS is subordinated to the BS, and if the SS is not subordinated to the BS, sending a ranging abort response to the SS; and terminating the ranging process by the SS after it receives the ranging abort response, and choosing a new channel and starting a ranging process again until the SS connects to a correct BS.

A BS according to the present invention mainly includes:

a ranging module, configured to cooperate with an SS to accomplish a ranging process; and an SS authentication module, connected to the ranging module, and configured to store a table of SS configuration information of itself and judge whether an SS is subordinated to it when receiving a ranging request from the SS via the ranging module, and control the ranging module to send a ranging abort response to the SS if it is determined that the SS is not subordinated to the BS.

It can be seen from the above that the present invention adopts a control process in which the access authentication and the ranging process between BS and SS are combined, and thereby solves the access problem when the SS is in an overlap area between two or more BSs, i.e. the SS is authenticated when it attempts to access a BS; if the SS is not subordinated to the BS, the SS is instructed to make a redirection, i.e. exit the ranging process, choose a new channel and perform ranging again until the SS connects to a correct BS. Thus the present invention overcomes the prior art drawback that an SS may be unable to access a network and unable to exit from another network in the case that the SS is required to access a predetermined BS. In addition, according to the present invention, only the ranging process of a BS needs to be modified, and the ranging process of an SS is performed completely in accordance with flows specified in the protocols, without any additional modifications. Therefore, the present invention is very convenient to implement and of practical.

DETAILED DESCRIPTION OF EMBODIMENTS

The present invention is further detailed in conjunction with exemplary embodiments and the accompanying drawings.

Figure 1:
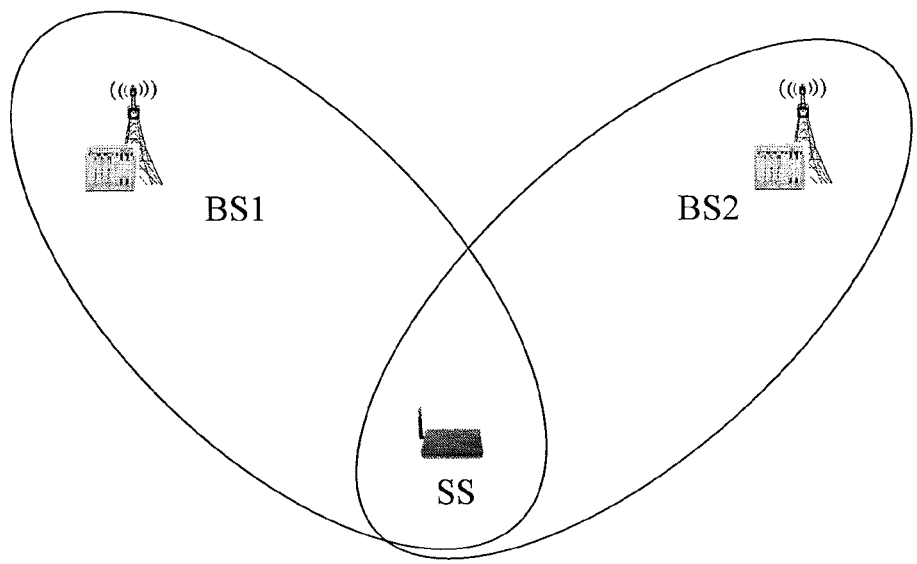
FIG. 1 is a schematic diagram which shows that an SS is in an overlap area between two BSs.
Figure 2:
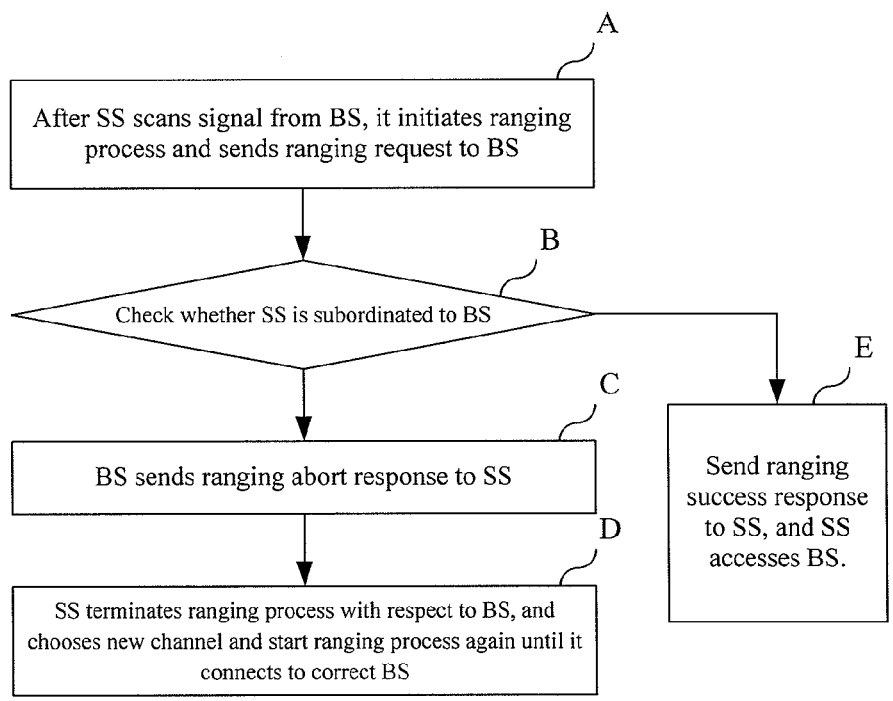
FIG. 2 is a flow diagram of a method for accessing a BS from an SS in the context of multiple BSs according to an exemplary embodiment of the present invention.

According to an exemplary embodiment of the present invention, a method for accessing a BS from an SS in the context of multiple BSs, the main process of which is shown in FIG. 2, includes:

A: In an initial ranging process, after scanning a signal from the BS, the SS initiates a ranging process and sends a ranging request to the BS.

B: The BS checks whether the SS is subordinated to the BS; if the BS checks and finds out that the SS is not subordinated to the BS, the BS executes step C; if the SS is subordinated to the BS, the BS executes step E.

In this step, the BS judges whether the SS is subordinated to it by checking the table of SS configuration information stored in the BS. Specifically, the checking process includes: the BS checks whether the SS is recorded in the table of SS configuration information of itself; if the SS is not found in the table of SS configuration information of the BS, it is determined that the SS is not subordinated to it; if the SS is found in the table of SS configuration information of the BS, it is determined that the SS is subordinated to the BS. For example, if the table of SS configuration information has records of MAC addresses of all SSs that are subordinated to the BS, the BS can determine whether an SS is subordinated to it based on whether the MAC address of the SS is recorded in the table of SS configuration information.

C: The BS sends a ranging abort response to the SS.

D: When receiving the ranging abort response, the SS terminates the ranging process, and performs a redirection process in which a new channel is chosen and a ranging process is started again until it accesses a correct BS.

E: If the SS passes all transactions in the ranging process of the BS, the BS will send a ranging success response to the SS, and the SS can access the BS.

The transactions described in this step have been defined in detail in relevant flows of the 802.16d protocols, for example, checking whether quality of signal is good enough.

Figure 3:
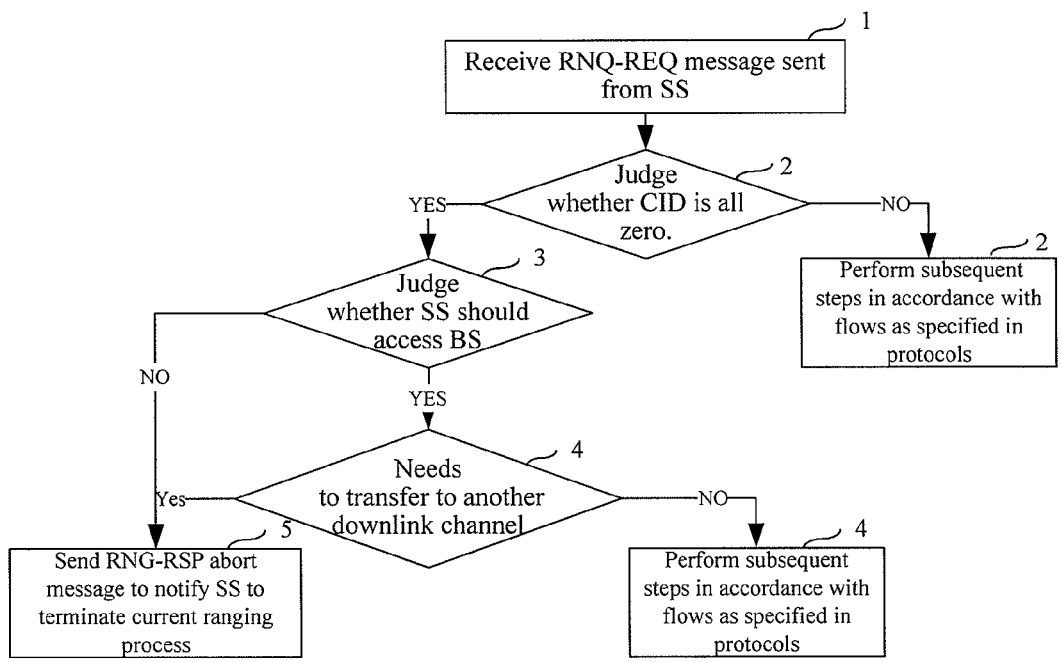
FIG. 3 is a schematic diagram of partial flows of an initial ranging process of the BS according to an exemplary embodiment of the present invention.

FIG. 3 is a schematic diagram of an initial ranging process flow of the BS in the above step A according to an exemplary embodiment of the present invention. In normal cases, the ranging process is used to obtain emission parameters of the SS, such as emission time deviation and emission power. As shown in FIG. 3, the initial ranging process mainly includes the following.

1. The BS receives a ranging request message RNG-REQ from the SS;

The RNG-REQ is a message sent during the ranging process, and is adapted to judge network delay, emission power, and change of downlink transmission mode.

2. The BS judges whether a connection identifier CID carried in the RNG-REQ is all zero; if the CID is not all zero, subsequent steps is executed in accordance with flows as specified in the 802.16d protocols.

The CID is a connection identifier as defined in the 802.16d protocols, according to which an all zero CID is used to transmit messages during a ranging process.

3. If the CID is all zero, the BS judges whether the SS should access the BS based on the MAC address of the SS. If the SS should not access the BS, the BS will send a ranging abort response RNG-RSP Abort to the SS, and terminate the ranging process of the BS with respect to the SS.

4. If the BS permits the SS to access it, the BS further judges whether to transfer the SS to another channel for processing based on the 802.16d protocols; if it is unnecessary to transfer the SS to another channel, the BS executes subsequent steps as specified in the 802.16d protocols.

5. If there is a need to transfer the SS to another channel, the BS will send a RNG-RSP Abort message to the SS, and the current initial ranging process is ended.

In the initial ranging process of the BS as described above, a step of judging SS subordination is added after the BS receives the RNG-REQ message. If the parameters of the SS are not configured in the BS, which shows that the SS should not access the current BS, the BS sends a ranging response RNG-RSP Abort to the SS to instruct the SS to terminate the ranging process of the SS with respect to the BS; the SS then may choose a new channel and carry out a ranging process again as specified in the 802.16d protocols, until it accesses a correct BS.

Figure 4:
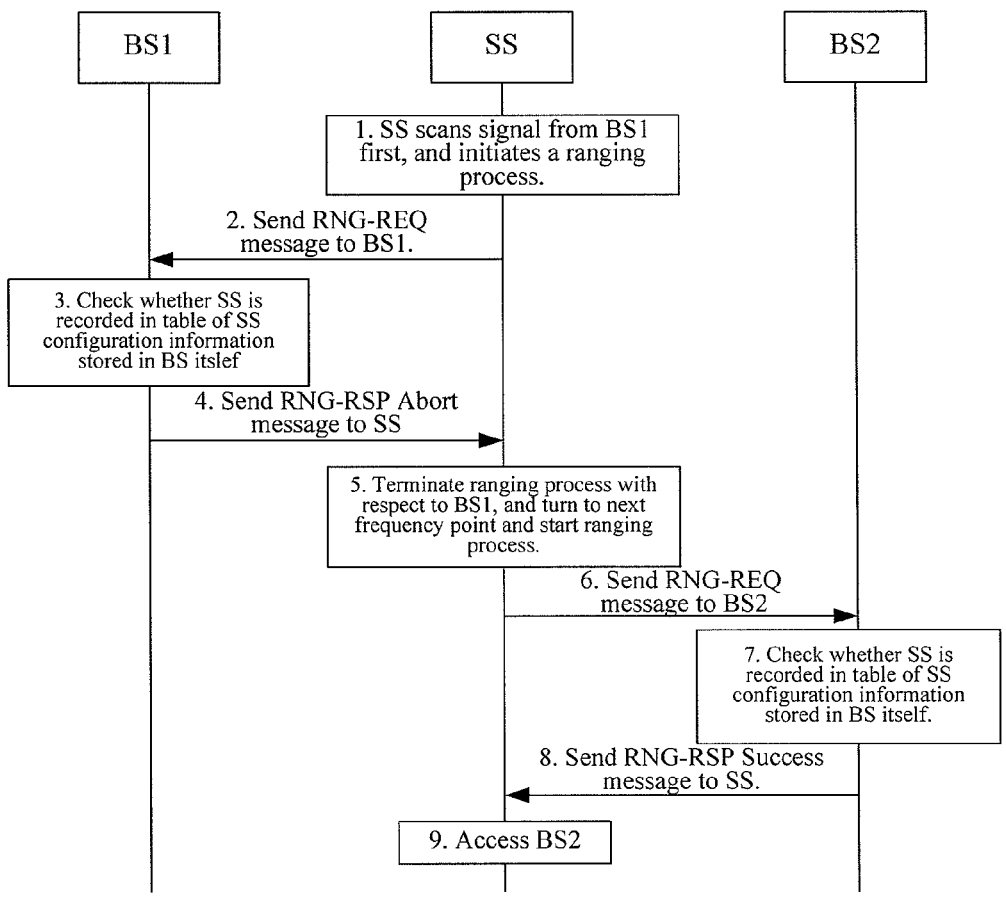
FIG. 4 is a schematic diagram of an access process of the SS according to an exemplary embodiment of the present invention.

FIG. 4 shows a schematic diagram of an access process of the SS according to an exemplary embodiment of the present invention. This embodiment will be described by taking an overlap area between only two base stations BS1 and BS2 as an example. It should be noted that the method described above can also be applied to situations where the overlap area is one between more than two BSs. In the initial ranging process, it is judged whether to permit the SS to access the current BS; if the BS does not permit the SS to access it, the BS terminates the ranging process and instructs the SS to search for another channel and access another BS. The specific steps are as follows.

1. In the initial ranging process, the SS scans a signal from the BS1 first, and initiates a ranging process.

2. The SS sends an RNG-REQ message to the BS1, and waits for the BS1 to return an RNG-RSP message.

3. The BS1 checks whether the SS is recorded in the table of SS configuration information stored therein.

4. If the SS is not recorded in the table of SS configuration information, the BS1 will send an RNG-RSP Abort message to the SS.

5. When the SS receives the RNG-RSP Abort message, it terminates its ranging process with respect to the BS1, turns to a next frequency point (e.g., the frequency point of the BS2), and starts a new ranging process.

6. The SS sends an RNG-REQ message to the BS2, and waits for the BS2 to return a RNG-RSP message.

7. The BS2 checks whether the SS is recorded in the table of SS configuration information stored therein.

8. If the SS is recorded in the table of SS configuration information stored in the BS2 and the SS passes all transactions in the ranging process of the BS2, the BS2 will send a ranging success response message RNG-RSP Success to the SS;

9. When receiving the RNG-RSP Success message, the SS accesses the BS2, and proceeds with subsequent steps of the initialization process as specified in the 802.16d protocols.

As indicated in the protocols, the initialization process is a very long process, and the ranging process is just a step in the initialization process.

Figure 5:
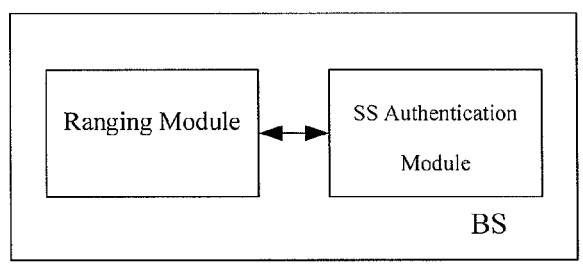
FIG. 5 shows an internal structure of the BS according to an exemplary embodiment of the present invention.

It can be seen from the above access process that, in order to implement access to a BS from an SS in the context of multiple BSs, the existing BS needs to be improved. FIG. 5 shows the internal structure of the BS according to an exemplary embodiment of the present invention. As shown in FIG. 5, in addition to a ranging module that is designed to cooperate with the SS to accomplish the ranging process, the BS further includes an SS authentication module that is connected to the ranging module and is designed to store a table of SS configuration information, and judge whether an SS is subordinated to the BS when receiving a ranging request from the SS via the ranging module, and control the ranging module to send a ranging abort response to the SS if it judges that the SS is not subordinated to the BS.

It can be seen from the above that the present invention combines, in a control process, the access authentication process and the ranging process between BS and SS, so that the SS is authenticated when it attempts to access the BS; if it is judged that the SS is not subordinated to the BS, the SS is instructed to make a redirection, exit the ranging process and choose a new channel and perform ranging again, until it connects to a correct BS. Thus the present invention solves the access problem when an SS is in the overlap area between two BSs. Those skilled in the art can appreciate that according to the above methods, only the ranging process of a BS needs to be modified, and the ranging process of an SS is performed completely in accordance with flows as specified in the protocols, without any additional modification. Therefore, the present invention is very convenient to use and practical.

Those skilled in the art should recognize that various variations and modifications can be made without departing from the spirit and essence of the present invention. The present invention has been illustrated with reference to some exemplary embodiments as above, which are mere some feasible examples and should not be construed to limit the scope of the present invention, and any equivalent modifications of the description and the drawings will fall within the scope as defined by the accompanying claims.

The invention claimed is:

1. A method for accessing a base station, comprising:
   receiving a ranging request from a subscriber station in a ranging process of the base station;
   checking whether the subscriber station is subordinated to the base station,
   sending out a ranging abort response to the subscriber station if the subscriber station is not subordinated to the base station;
   wherein the ranging abort response is configured to instruct the Subscriber Station to terminate the ranging process with respect to the base station and start a ranging process with respect to another base station, and
   judging whether the subscriber station passes all transactions in the ranging process with respect to the base station if the subscriber station is subordinated to the base station; and sending out a ranging abort response to the subscriber station if the subscriber station does not pass all transactions in the ranging process with respect to the base station.

2. The method for accessing a base station according to claim 1, further comprising: judging whether there is a need to transfer the subscriber station to another channel for processing if the subscriber station passes all transaction in the ranging process with respect to the base station; and sending out a ranging abort response to the subscriber station if there is a need.

3. The method for accessing a base station according to claim 2, further comprising: sending out a ranging success response to the subscriber station if there isn't a need to transfer the subscriber station to another channel for processing.

4. The method for accessing a base station according to claim 1, wherein checking whether the subscriber station being subordinated to the base station comprises: checking by the base station whether the subscriber station is recorded in a table of subscriber station configuration information stored in the base station; if the subscriber station is not recorded in the table of subscriber station configuration information, the subscriber station is not subordinated to the base station; if the subscriber station is recorded in the table of subscriber station configuration information, the subscriber station is subordinated to the base station.

5. The method for accessing a base station according to claim 4, wherein the table of subscriber station configuration information stores MAC addresses of all subscriber stations that are subordinated to the base station; and wherein the checking whether the subscriber station is recorded in the table of subscriber station configuration information of the base station comprises: judging by the base station whether the subscriber station is recorded in the table of subscriber station configuration information according to the MAC address of the subscriber station.

6. The method for accessing a base station according to claim 1, further comprising: judging by the base station whether a Connection Identifier (CID) carried in the ranging request is all zero; if the CID is all zero, checking whether the subscriber station is subordinated to the base station.

7. The method of claim 1, wherein the subscriber station is not subordinated to the base station when the subscriber station is pre-assigned to another base station and is unable to be handed over to the base station.

8. The method of claim 7, wherein the subscriber station is an IEEE 802.16 residential gateway.

9. The method of claim 1, wherein the subscriber station is an IEEE 802.16 residential device.

10. The method of claim 9, wherein the subscriber station is not subordinated to the base station when the subscriber station is pre-assigned to another base station and is unable to be handed over to the base station.

11. A base station, comprising:
    a subscriber station authentication module, configured to determine whether a subscriber station is subordinated to the base station when receiving a ranging request from the subscriber station in a ranging process with respect to the base station,
    control a ranging module to send out a ranging abort response when the subscriber station is not subordinated to the base station;
    wherein the ranging module is configured to send out the ranging abort response under the control of the subscriber station authentication module,
    wherein the ranging abort response is configured to instruct the subscriber station to terminate the ranging process with respect to the base station and start a ranging process with respect to another base station, and
    judging whether the subscriber station passes all transactions in the ranging process with respect to the base station if the subscriber station is subordinated to the base station; and sending out a ranging abort response to the subscriber station if the subscriber station does not pass all transactions in the ranging process with respect to the base station.

12. The base station according to claim 1, wherein the subscriber station authentication module is further configured to store a table of subscriber station configuration information used for determining whether the subscriber station is subordinated to the base station.

13. A system, comprising:
    a base station, in communication with a subscriber station, configured to check whether the subscriber station is subordinated to the base station after receives a ranging request from the subscriber station in a ranging process with respect to the base station;
    send a ranging abort response to the subscriber station if the subscriber station is not subordinated to the base station,
    wherein the ranging abort response is configured to instruct the subscriber station to terminate the ranging process with respect to the base station, and start a ranging process with respect to another base station, and
    judging whether the subscriber station passes all transactions in the ranging process with respect to the base station if the subscriber station is subordinated to the base station; and sending out a ranging abort response to the subscriber station if the subscriber station does not pass all transactions in the ranging process with respect to the base station.

14. A subscriber station, comprising:
a first module, configured to send out a ranging request to a base station when the first module scans a signal from the base station and configured to receive a ranging abort response from the base station,
wherein the ranging abort response is sent if the subscriber station is not subordinated to the base station;
a second module, configured to terminate an ongoing ranging process with respect to the base station based on receiving the ranging abort response from the base station by the first module and start a new ranging process with respect to another base station,
wherein the base stations have an overlapping area, and
judging whether the subscriber station passes all transactions in the ranging process with respect to the base station if the subscriber station is subordinated to the base station; and
sending out a ranging abort response to the subscriber station if the subscriber station does not pass all transactions in the ranging process with respect to the base station.

15. A method for accessing a base station, comprising:
sending a ranging request to a base station when scanning a signal from the base station;
receiving a ranging abort response from the base station, wherein the ranging abort response is sent if the subscriber station is not subordinated to the base station;
terminating an ongoing ranging process with respect to the base station based on receiving the ranging abort response from the base station;
starting a new ranging process with respect to another base station, wherein the base stations have an overlapping coverage area, and
judging whether the subscriber station passes all transactions in the ranging process with respect to the base station if the subscriber station is subordinated to the base station; and
sending out a ranging abort response to the subscriber station if the subscriber station does not pass all transactions in the ranging process with respect to the base station.

* * * * *

UNITED STATES PATENT AND TRADEMARK OFFICE
CERTIFICATE OF CORRECTION

| | |
|---|---|
| PATENT NO. | : 8,185,106 B2 |
| APPLICATION NO. | : 12/106194 |
| DATED | : May 22, 2012 |
| INVENTOR(S) | : Keliang Zhang and Liubo Mei |

It is certified that error appears in the above-identified patent and that said Letters Patent is hereby corrected as shown below:

Column 6, line 47, claim 12, should read "The base station according to claim 11, wherein the subscriber station authentication module is further configured to store a table of subscriber station configuration information used for determining whether the subscriber station is subordinated to the base station."

Signed and Sealed this
Twenty-fifth Day of September, 2012

David J. Kappos
*Director of the United States Patent and Trademark Office*